United States Patent
Udagawa

[19]

[11] Patent Number: 6,036,195
[45] Date of Patent: Mar. 14, 2000

[54] METAL GASKET WITH DOUBLE BEADS

[75] Inventor: Tsunekazu Udagawa, Ichikawa, Japan

[73] Assignee: Ishikawa Gasket Co., Ltd., Tokyo, Japan

[21] Appl. No.: 09/037,015

[22] Filed: Mar. 9, 1998

[51] Int. Cl.[7] .................................................. F16J 15/08
[52] U.S. Cl. .......................................... 277/595; 277/593
[58] Field of Search .................................... 277/593, 594, 277/595, 639

[56] References Cited

U.S. PATENT DOCUMENTS

| | | | |
|---|---|---|---|
| 843,394 | 2/1907 | Haynes | 277/595 |
| 4,203,608 | 5/1980 | Nicholson | 277/595 |
| 4,516,784 | 5/1985 | Merz | 277/639 |
| 4,803,965 | 2/1989 | Udagawa et al. | 277/595 X |
| 4,867,462 | 9/1989 | Udagawa | 277/595 |
| 4,995,624 | 2/1991 | Udagawa et al. | 277/595 |
| 5,022,661 | 6/1991 | Nakasone | 277/591 |
| 5,232,229 | 8/1993 | Udagawa | 277/595 |
| 5,536,024 | 7/1996 | Udagawa | 277/595 |
| 5,570,892 | 11/1996 | Udagawa | 277/595 |
| 5,711,537 | 1/1998 | Inamura et al. | 277/595 |
| 5,957,463 | 9/1999 | Inamura | 277/593 |

FOREIGN PATENT DOCUMENTS 8-5419  2/1996  Japan .

*Primary Examiner*—Lynne H. Browne
*Assistant Examiner*—Greg Binda
*Attorney, Agent, or Firm*—Kanesaka & Takeuchi

[57] ABSTRACT

A metal gasket of the invention is used for an internal combustion engine. The gasket is formed of at least one metal plate extending substantially throughout an entire area of the engine to be sealed, and includes a plurality of fluid holes including cylinder bores and liquid holes. Double beads are formed in the metal plate and located around at least one of the fluid holes. The double beads are an inner bead and an outer corrugated bead surrounding the inner bead to securely and widely seal around the fluid hole. The outer corrugated bead provides surface pressures partly differently when the corrugated bead is compressed, to thereby seal around the fluid hole and to support the pressure applied thereto.

15 Claims, 2 Drawing Sheets

METAL GASKET WITH DOUBLE BEADS

BACKGROUND OF THE INVENTION AND RELATED ART STATEMENT

The present invention relates to a metal gasket for an internal combustion engine, which includes double beads, i.e. inner bead and outer corrugated bead, to securely and widely seal around a hole.

An engine and a gasket installed therein for an automobile include cylinder bores, water holes, oil holes, bolt holes and so on. Since high pressure and temperature are formed in the cylinder bores when the engine is actuated, bolts for securing the engine parts together with the gasket are generally arranged around the cylinder bores to securely seal therearound. Other holes, such as water holes and oil holes, are situated near the cylinder bores, and are sealed by the tightening pressure of the bolts for sealing the cylinder bores.

Therefore, the other holes, i.e. water holes and oil holes, do not generally receive equal tightening pressure from the bolts. As a result, although the other holes have sealing means in the gasket, various sealing problems occur in these other holes.

For example, in case a rigidity of a cylinder head and/or cylinder block is not strong, no matter where a hole to be sealed is located, i.e. even if the hole is located away from or close to the bolt holes, the sealing means of the gasket may not be sufficiently compressed to possibly cause leakage. On the other hand, in case the rigidity of the cylinder head and/or cylinder block is strong, if sealing means for a hole is not strong against a high tightening pressure, the sealing means is weakened or creeps by the high tightening pressure to thereby cause leakage as well. Regardless of the rigidity of the engine, if the sealing means is formed close to the cylinder bore, the sealing means may creep by high temperature to possibly cause leakage.

Further, in an elongated engine, since the sealing means are formed around the cylinder bores of the gasket, when the engine is assembled, the center area of the cylinder head is liable to bent upwardly while the longitudinal end areas are compressed close to the cylinder block. Therefore, high tightening pressures are concentrated at the longitudinal end areas of the gasket.

In order to solve the problems, various attempts have been made. For example, a bead for surrounding a fluid hole is partially doubled at a portion away from the bolt hole to increase the surface pressure at the doubled portion, and a strength of a bead surrounding a fluid hole is partially changed to regulate the surface pressure. Also, in U.S. Pat. No. 5,570,892, a portion of a bead away from bolt holes where a high surface pressure is not formed is corrugated to form a wide corrugated bead portion. Further, in U.S. Pat. No. 5,439,234, beads around the cylinder bores located at the longitudinal end portions are doubled to support the strong tightening pressures applied thereto.

In Japanese Utility Model Publication (KOKOKU) No. 8-5419, an expandable corrugated bead is formed around a circular bead outside a cylinder bore, wherein the corrugated bead receives tightening pressure less than that on the other portions.

The conventional sealing means or beads around the fluid hole can seal properly as intended. However, the sealing can not be always made properly by the conventional sealing means or beads because of the difference of the surface pressure applied to the sealing means.

The present invention has been made in view of the conventional gaskets, and an object of the invention is to provide a metal gasket for an internal combustion engine, which can securely seal around a hole by double beads.

Another object of the invention is to provide a metal gasket as stated above, which can provide a wide sealing area to withstand high pressure applied thereto.

A further object of the invention is to provide a metal gasket as stated above, wherein the wide sealing area can be formed as desired.

Further objects and advantages of the invention will be apparent from the following description of the invention.

SUMMARY OF THE INVENTION

A metal gasket of the invention is used for an internal combustion engine. The gasket is formed of at least one metal plate extending substantially throughout an entire area of the engine to be sealed. The metal plate includes a plurality of fluid holes including cylinder bores and liquid holes therein.

In the present invention, double beads are formed in the metal plate to be located around at least one of the fluid holes. The double beads are formed of an inner bead and an outer corrugated bead surrounding the inner bead. The hole is securely sealed by the inner bead and the outer corrugated bead.

In the invention, the inner bead mainly seals securely around the hole to be sealed, while the outer corrugated bead seals around the hole and supports the tightening pressure applied thereto. Since the outer corrugated bead covers the wide area, even if a high tightening pressure is applied thereto, the corrugated bead can support the pressure without creep relaxation.

The outer corrugated bead has a constant height throughout an entire length thereof and changes distances to an edge of the hole where the outer corrugated bead surrounds. The area to be covered by the outer corrugated bead may be changed as desired.

The double beads are formed at a portion in the metal plate where a surface pressure sufficient to seal around the fluid hole is hardly obtained, i.e. the surface pressure is weak. On the other hand, the double beads may be formed to a portion where a strong surface pressure which may cause creep relaxation to the beads is applied.

The inner bead may be a smooth bead without corrugations, or the inner bead may be a corrugated bead. The corrugated bead as the inner bead may have a shape different from that of the outer corrugated bead.

In the invention, number, width and height of the corrugations of the inner and outer beads may be changed according to the pressures applied thereto. For example, if the inner and outer beads are located away from a bolt hole, the inner bead may be a circular bead, while number of the corrugations of the outer bead may be changed such that the portion of the outer bead away from the bolt hole has a large number of corrugations than that close to the bolt hole to support a large pressure applied at the portion away from the bolt hole. Instead of increasing the number of the corrugations, the width of the corrugations may be narrowed or the height of the corrugations may be increased.

The gasket may include first and second metal plates piled together to constitute a metal laminate gasket. The first metal plate has one of the inner bead and the outer corrugated bead, and the second metal plate has the other of the inner bead and the outer corrugated bead. A flat third plate may be disposed between the first and second metal plates.

DETAILED DESCRIPTION OF PREFERRED EMBODIMENTS

Figure 1:
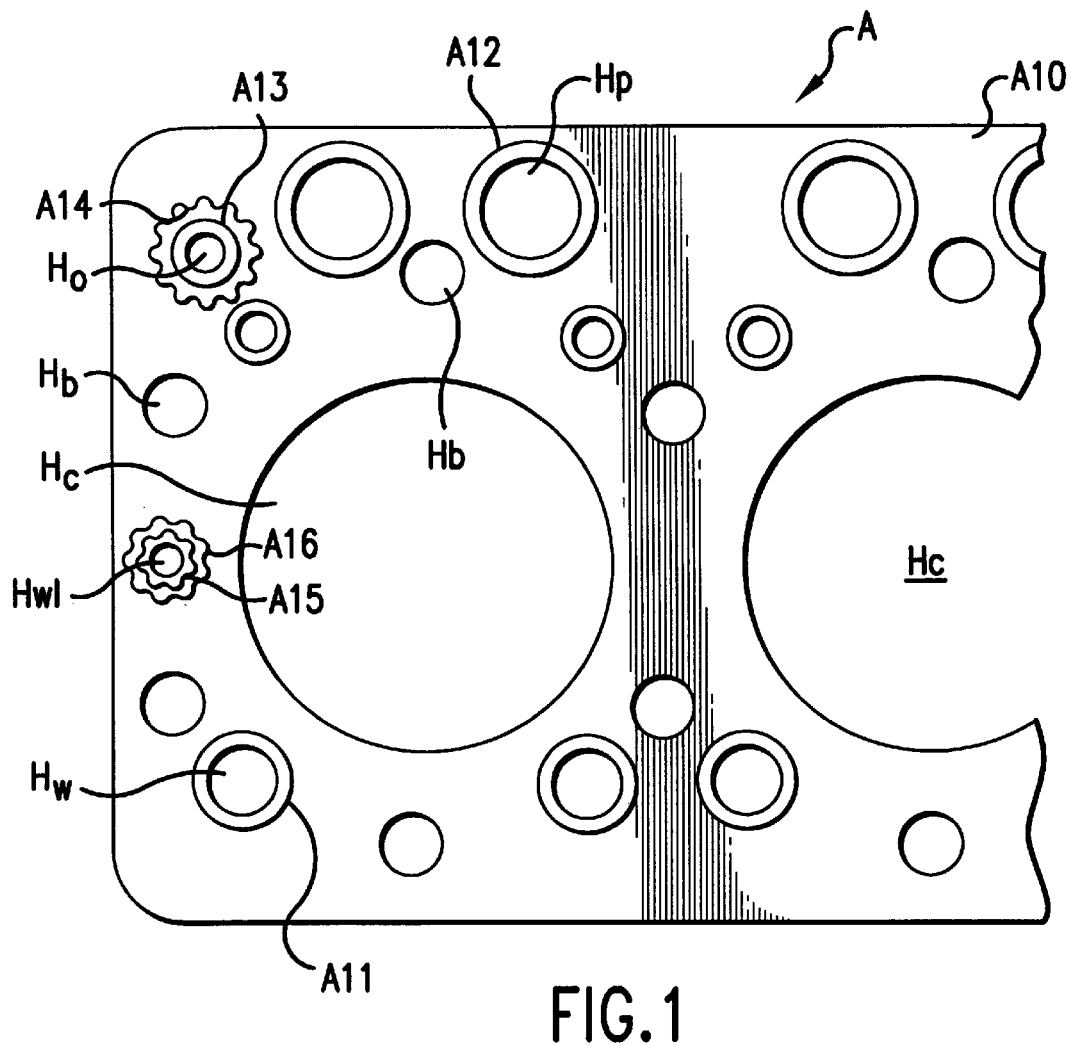
FIG. 1 is a partial plan view of a first embodiment of a metal gasket of the invention.
Figure 2:
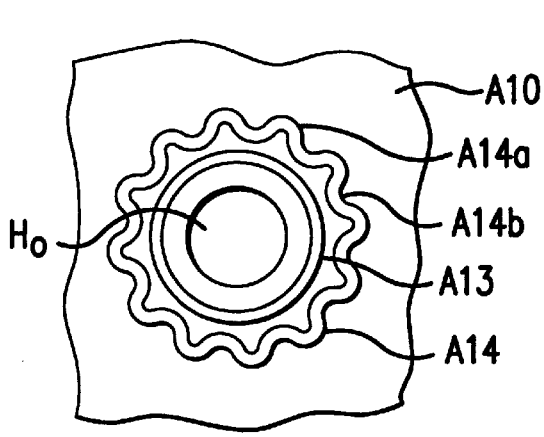
FIG. 2 is an enlarged plan view for showing a part of the metal gasket around an oil hole shown in FIG. 1.
Figure 3:
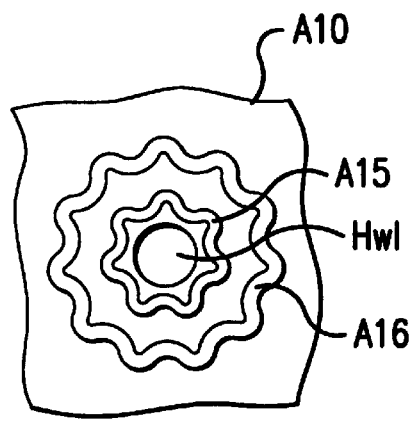
FIG. 3 is an enlarged plan view for showing a part of the metal gasket around a water hole shown in FIG. 1.

With reference to FIGS. 1–3, a first embodiment A of a metal gasket of the invention is explained.

The gasket A is a cylinder head gasket formed of one metal plate A10 extending throughout an entire area of an engine to be sealed. The gasket A includes a plurality of cylinder bores Hc, water holes Hw, Hw1, oil holes Ho, bolt holes Hb, push rod holes Hp, and so on, as in the conventional gasket. Although no sealing means is shown around the cylinder bores Hc, beads or appropriate sealing means are formed around the cylinder bores Hc. Also, beads A11, A12 are formed around the water holes Hw and push rod holes Hp.

In the engine where the gasket A is installed, the rigidity of the engine is not so strong. Therefore, the area near the bolts can be tightened strongly, but the area away from the bolts can not be tightened so strongly. On the other hand, in the gasket A, the oil hole Ho is located at a corner of the gasket outside the bolt holes Hb. Therefore, when the gasket is tightened, high tightening pressure is not formed at the area around the oil hole Ho. Thus, the oil hole Ho is sealed according to the present invention.

As shown in FIG. 2, the metal plate A10 includes a circular bead A13 and a corrugated bead A14 around the oil hole Ho, which project outwardly from the metal plate A10. The heights and widths of the beads A13, A14 are constant and the same throughout the entire lengths thereof, but the heights and widths may be changed as required. For example, the height of the corrugated bead A14 may be lower than that of the bead A13 to moderately support the area around the oil hole Ho.

The distances of the corrugated bead A14 to the edge of the oil hole Ho, i.e. from an outward portion A14a to the edge and from an inward portion A14b to the edge, change like a waving shape. Thus, a wide area in an annular shape is covered by the corrugated bead A14. The number of the corrugations and the area covered by the corrugated bead A14 can be determined by the size of the hole and the pressure applied thereto.

Also, in the gasket A, a water hole Hw1 is formed at an edge portion of the gasket near the cylinder bore Hc. Since the water hole Hw1 is located close to the cylinder bore Hc, a high temperature is applied to the water hole Hw1.

Therefore, the area around the water hole Hw1 is also sealed according to the present invention. Namely, inner and outer corrugated beads A15, A16 are formed around the water hole Hw1. The heights and widths of the corrugated beads A15, A16 are the same throughout the entire lengths, but the shapes thereof are different. Namely, the outer corrugated bead A16 has corrugations more than those of the inner corrugated bead A15.

When the gasket A is situated between a cylinder head and a cylinder block (both not shown) and is tightened, the beads A1–A16 are compressed to provide surface pressures thereat, which securely seal around the holes. Namely, the beads A13, A14 seal around the oil hole Ho, while the corrugated beads A15, A16 seal around the water hole Hw1.

In regard to the oil hole Ho, although the rigidity of the engine is not so strong, since the corrugated bead A14 is formed around the oil hole Ho in addition to the bead A13, the oil hole Ho can be securely sealed by the double beads. Also, since the corrugated bead A14 is formed outside the bead A13, the bead A13 can receive a relatively constant tightening pressure, which helps sealing around the oil hole Ho.

In regard to the water hole Hw1, although a high temperature is applied to the water hole Hw1 when the engine with the gasket A is actuated, since the corrugated beads A15, A16 are formed around the water hole Hw1, the corrugated beads A15, A16 do not substantially creep. Namely, heat applied to the corrugated beads A15, A16 is widely spread, and the tightening pressure applied to the corrugated beads A15, A16 per an area is reduced, so that the possibility of causing a creep relaxation at the corrugated beads A15, A16 is significantly reduced. Thus, the water hole Hw1 can be securely sealed without creep relaxation.

In this connection, if a conventional circular bead is simply formed around the water hole Hw1, since a high temperature is applied to the circular bead, the circular bead may creep and cause water leakage from the water hole Hw1.

In the cylinder head gasket, when the engine is assembled and tightened, high tightening pressures are applied to the longitudinal end portions, which bend the middle portion of the cylinder head upwardly. In the gasket A, when the engine is tightened, the high tightening pressures are applied to the longitudinal end portions, as well. However, since the corrugated beads are formed around the water hole Hw1 between the bolt holes Hb located at the longitudinal end portion, the corrugated beads support the tightening pressure thereat. Therefore, the bending of the cylinder head is reduced or prevented. Also, the oil hole Ho located outside the bolt holes can be securely sealed.

Figure 4:
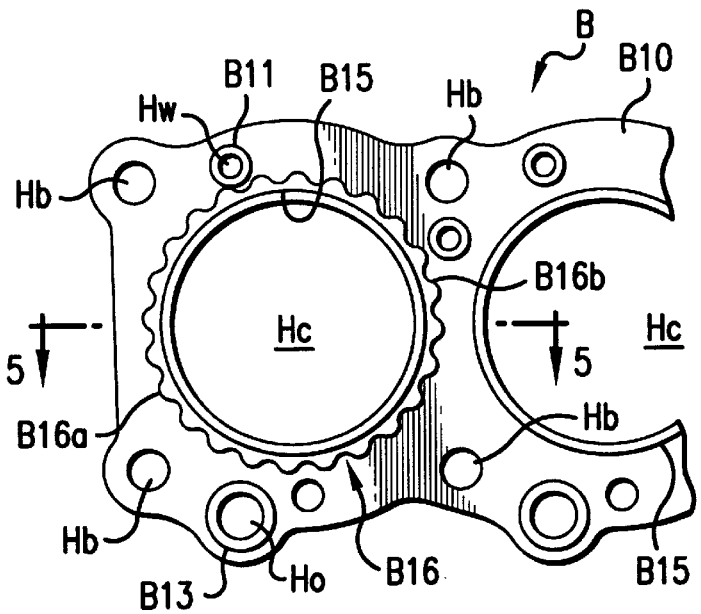
FIG. 4 is a partial plan view of a second embodiment of a metal gasket of the invention.
Figure 5A:
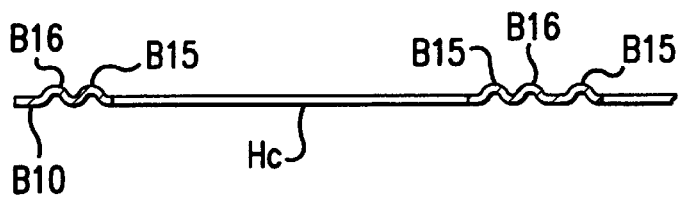
FIG. 5(a) is an enlarged sectional view taken along line 5—5 in FIG. 4.

FIGS. 4 and 5(a) show a second embodiment B of a metal gasket of the invention. The gasket B is formed of a metal plate B10, and includes a plurality of cylinder bores Hc, water holes Hw, oil holes Ho, bolt holes Hb, and so on, similar to the gasket A. Sealing means B11, B13 are formed around the water holes Hw and oil hole Ho.

In the gasket B, the metal plate B10 includes circular beads B15 around all the cylinder bores Hc, and corrugated beads B16 around the cylinder bores Hc located at only longitudinal ends of the gasket B. The circular beads B15 securely seal around the respective cylinder bores Hc as regular sealing means, and the corrugated beads B16 seal the cylinder bores Hc and support the tightening pressure applied thereto. In one corrugated bead or first area B16, number of the corrugations B16a at the longitudinal end area or second area is greater than the number of corrugations B16b at the side or second area facing the middle area of the gasket. Since the tightening pressure applied to the corrugations B16a is higher than that applied to the corrugations B16b, the number of corrugations is changed in one bead B16.

Since the corrugated beads B16 can cover relatively wide areas at the longitudinal end areas, even if high tightening pressures are applied to the longitudinal end areas, the corrugated beads B16 can support the tighten pressures. Accordingly, all the beads B15 around the cylinder bores can be substantially equally compressed. The gasket B is useful for the engine with relatively weak rigidity, in which high tightening pressures are applied to the longitudinal end areas.

Figure 5B:
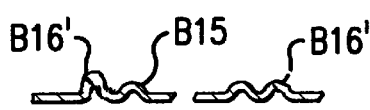
FIGS. 5(b) and 5(c) are sectional views, similar to FIG. 5(a), for showing modifications of the gaskets of the invention.
Figure 5C:
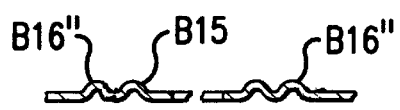

The corrugated bead B16 has the constant height and width. However, the height and width of the corrugations may be changed in one corrugated bead B16. For example, the heights of the corrugations B16' at the longitudinal end area may be made high (FIG. 5(b)), or the widths of the corrugations B16" at the longitudinal end area may be narrowed (FIG. 5(c)), to provide high surface pressures.

Figure 6:
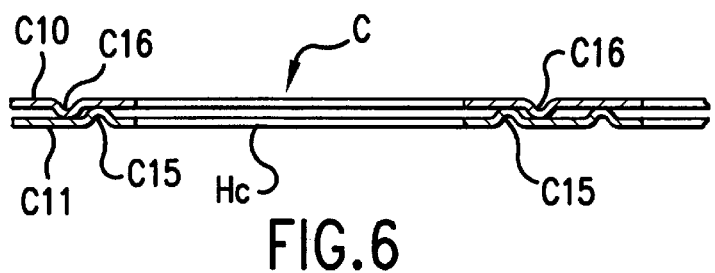
FIG. 6 is an enlarged sectional view, similar to FIG. 5(a), for showing a third embodiment of the invention.

FIG. 6 shows a third embodiment C of a metal gasket of the invention. The gasket C includes the cylinder bores Hc, water holes Hw, oil holes Ho and bolt holes Hb, similar to the gasket B. Although the gasket B is formed of one metal plate B10, the gasket C is formed of an upper plate C10 and a lower plate C11 to constitute a metal laminate gasket.

The lower plate C11 includes circular beads C15 around all the cylinder bores Hc, while the upper plate C10 includes corrugated beads C16 around the cylinder bores located at the longitudinal ends of the gasket. When the upper and lower plates C10, C11 are assembled and compressed, the beads C15, C16 are compressed to securely seal around the cylinder bores Hc, and the corrugated beads C16 support the tightening pressures applied thereto. The gasket C operates as in the gasket B.

Although it is not shown in the drawings, one or more metal plates may be disposed between the upper and lower plates C10, C11. Also, the orientations of the beads C15, C16 may be changed in the opposite directions.

In the invention, the cylinder bores or fluid holes can be securely sealed by the combination of the inner bead and the outer corrugated bead. Further, the tightening pressure applied to the gasket can be supported by the corrugated beads for the wide area. Thus, the leakage of a fluid and creep relaxation of the bead are substantially prevented. The gasket may be formed of one or more metal plates including the inner bead and the outer corrugated bead around the fluid hole.

While the invention has been explained with reference to the specific embodiments of the invention, the explanation is illustrative, and the invention is limited only by the appended claims.

What is claimed is:

1. A metal gasket for an internal combustion engine, comprising:
    at least one metal plate extending substantially throughout an entire area of the engine to be sealed,
    a plurality of fluid holes including cylinder bores and liquid holes, situated in the at least one metal plate, and
    double beads formed in the at least one metal plate to be located around at least one of the fluid holes, said double beads being formed of an inner bead and an outer corrugated bead surrounding the inner bead to widely seal around the at least one of the fluid holes, said outer corrugated bead having an outer bead edge with outward portions and inward portions located closer to an edge of said at least one of the fluid holes than said outward portions to form a waving shape between the outward and inward portions so that the double beads cooperate together to securely and widely seal around the at least one of the fluid holes.

2. A metal gasket according to claim 1, wherein said outer corrugated bead provides a first area forming a first surface pressure and a second area forming a second surface pressure different from the first surface pressure, when the outer corrugated bead is compressed.

3. A metal gasket according to claim 2, wherein said outer corrugated bead has a predetermined number of corrugations, a number of corrugations in one outer corrugated bead being different in a unit area to provide different surface pressures in one outer corrugated bead.

4. A metal gasket according to claim 2, wherein said outer corrugated bead has portions with different widths to provide different surface pressures in one outer corrugated bead.

5. A metal gasket according to claim 2, wherein said outer corrugated bead has portions with different heights to provide different surface pressures in one outer corrugated bead.

6. A metal gasket according to claim 2, wherein said inner bead is a corrugated bead having a shape different from that of the outer corrugated bead.

7. A metal gasket according to claim 1, wherein said outward portions and inward portions disposed on the outer bead edge are different in length from the edge of the at least one of the fluid holes, and the waving shape continues entirely around the at least one of the fluid holes.

8. A metal gasket according to claim 7, wherein said outer corrugated bead substantially supports a tightening pressure applied thereto.

9. A metal gasket for an internal combustion engine, comprising:
    at least one metal plate extending substantially throughout an entire area of the engine to be sealed,
    a plurality of fluid holes including cylinder bores and liquid holes, situated in the at least one metal plate, and
    double beads formed in the at least one metal plate to be located around at least one of the fluid holes, said double beads being formed of an inner bead and an outer corrugated bead surrounding the inner bead to widely seal around the at least one of the fluid holes, said outer corrugated bead having an outer bead edge with outward portions and inward portions located closer to an edge of said at least one of the fluid holes than said outward portions to form a waving shape between the outward and inward portions and providing a first area forming a first surface pressure and a second area forming a second surface pressure different from the first surface pressure, when the corrugated bead is compressed.

10. A metal gasket according to claim 9, wherein said outer corrugated bead has a predetermined number of corrugations, a number of corrugations in one outer corrugated bead being different in a unit area to provide different surface pressures in one outer corrugated bead.

11. A metal gasket according to claim 9, wherein said outer corrugated bead has portions with different widths to provide different surface pressures in one outer corrugated bead.

12. A metal gasket according to claim 9, wherein said outer corrugated bead has portions with different heights to provide different surface pressures in one outer corrugated bead.

13. A metal gasket according to claim 9, wherein said inner bead is a corrugated bead having a shape different from that of the outer corrugated bead.

14. A metal gasket according to claim 9, wherein said at least one metal plate includes first and second metal plates piled together to constitute a metal laminate gasket, said first metal plate having one of the inner bead and the outer corrugated bead and said second metal plate having the other of the inner bead and the outer corrugated bead.

15. A metal gasket according to claim 9, wherein said outer corrugated bead substantially supports a tightening pressure applied thereto.

* * * * *

UNITED STATES PATENT AND TRADEMARK OFFICE
CERTIFICATE OF CORRECTION

PATENT NO : 6,036,195
DATED : March 14, 2000
INVENTOR(S) : Tsunekazu Udagawa

It is certified that error appears in the above-identified patent and that said Letters Patent is hereby corrected as shown below:

In column 4, line 6, change "A1-A16" to --A13-A16--;

line 57, delete "or first area"; and line 59, change "second" to --first--.

Signed and Sealed this

Sixth Day of March, 2001

Attest:

NICHOLAS P. GODICI

Attesting Officer

Acting Director of the United States Patent and Trademark Office